United States Patent [19]

Fisher

[11] Patent Number: 5,106,399
[45] Date of Patent: Apr. 21, 1992

[54] ARGON PURIFICATION SYSTEM

[75] Inventor: Theodore F. Fisher, Amherst, N.Y.

[73] Assignee: Union Carbide Industrial Gases Technology Corporation, Danbury, Conn.

[21] Appl. No.: 660,060

[22] Filed: Feb. 25, 1991

[51] Int. Cl.⁵ ............................................. F25J 3/04
[52] U.S. Cl. ...................................... 62/22; 55/66; 62/23; 423/262
[58] Field of Search .................... 62/9, 11, 22, 23; 55/66; 423/262

[56] References Cited

U.S. PATENT DOCUMENTS

| | | | |
|---|---|---|---|
| 3,257,812 | 6/1966 | Shaievitz | 62/18 |
| 3,838,553 | 10/1974 | Doherty | 55/58 |
| 3,928,004 | 12/1975 | Bligh et al. | 55/66 |
| 3,944,400 | 3/1976 | Bird | 55/66 |
| 4,283,212 | 8/1981 | Graham et al. | 62/23 |
| 4,477,265 | 10/1984 | Kumar et al. | 55/26 |
| 4,629,407 | 12/1986 | Amlinger | 425/7 |
| 4,687,498 | 8/1987 | MacLean et al. | 62/17 |
| 4,689,062 | 8/1987 | MacLean et al. | 62/18 |
| 4,713,224 | 12/1987 | Tamhankar et al. | 423/219 |
| 4,817,392 | 4/1989 | Agrawal et al. | 62/18 |
| 4,834,956 | 5/1989 | Agrawal et al. | 423/262 |
| 4,838,912 | 6/1989 | Amlinger | 62/9 |

Primary Examiner—Ronald C. Capossela
Attorney, Agent, or Firm—Stanley Ktorides

[57] ABSTRACT

An argon purification system comprising an ambient temperature molecular sieve adsorption step, an ambient temperature chemisorption step, and a cryogenic temperature adsorption step, particularly useful with liquefaction of the purified argon.

14 Claims, 1 Drawing Sheet

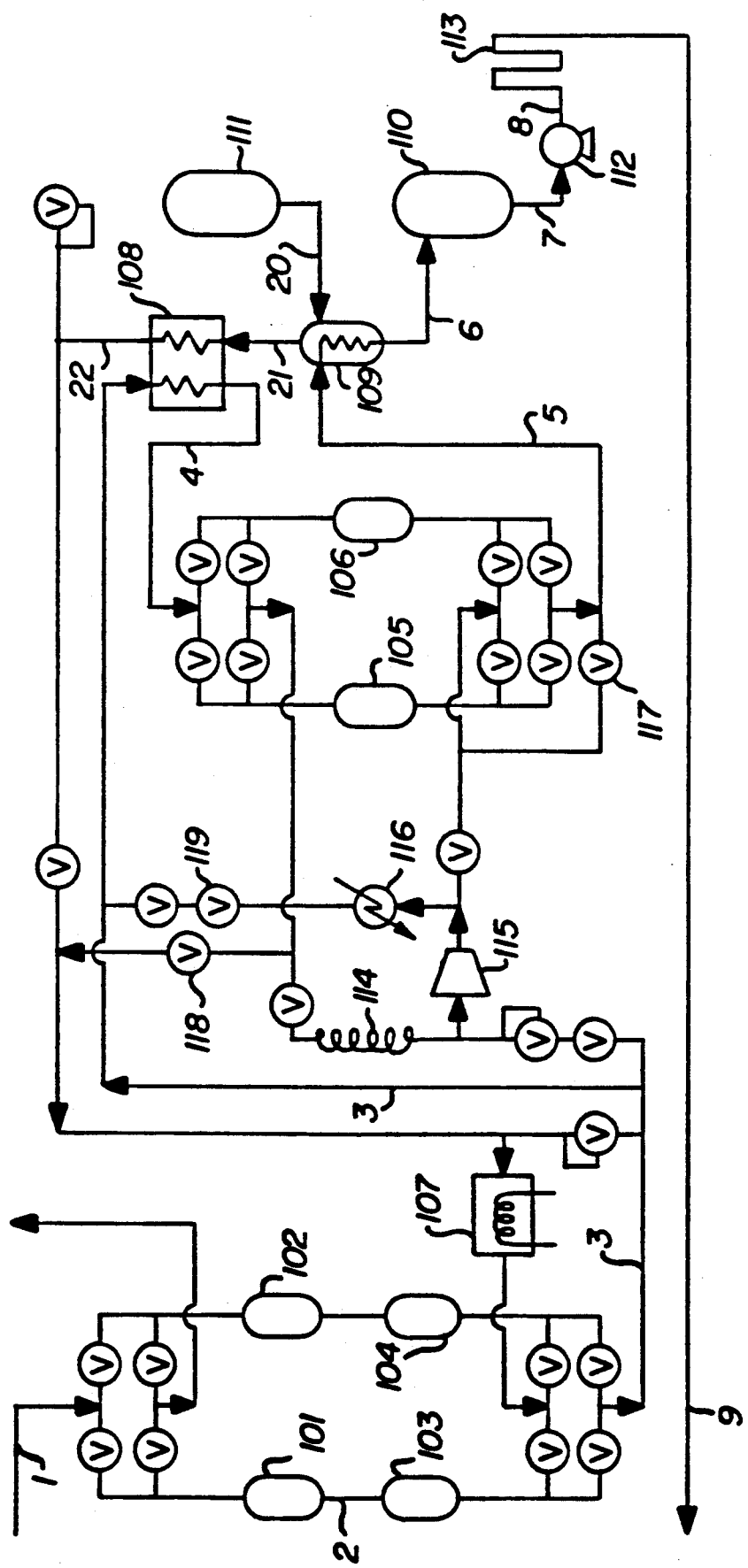

ARGON PURIFICATION SYSTEM

TECHNICAL FIELD

This invention relates generally to argon purification and more specifically to argon purification on-site for recycle and reuse.

BACKGROUND ART

Argon is employed in various processes wherein its chemically inert nature, specific physical properties, and a cost which is low relative to those of other noble gases make its use particularly advantageous. For example, argon is used as a blanketing or purge gas, as a heat transfer medium, for the degassing of reactive impurities in various metal processing operations, and for the atomization of molten metals into fine powder.

While argon is present in air at a much higher concentration than those of the other noble gases, and considerable volumes of argon are available as a byproduct of oxygen and nitrogen production by air separation, the cost of argon still provides significant incentive toward maximizing recycle usage. Therefore, systems have been commercially implemented to conserve argon by means of pressure equalization between vessels, recompression and recycle, generally with particulate separation.

However, the operations in which the argon is utilized often involve periodic exposure of various parts of the system to the surrounding atmosphere. Steps which are conducted at low pressure or vacuum are subjected to potential air infiltration. In addition, materials being processed may degas various impurities. Thus there is a need to purify the spent argon prior to recycle and reuse.

The operation of systems in which argon is employed is frequently batch in nature, resulting in periodic requirements for very high flowrates over relatively short time intervals, and other times when throughput is very low or absent. High pressure receivers, or reliquefaction for compact storage, may be utilized to accommodate these requirements. These conditions make it difficult to match the desired gas contaminant removal to reasonably-sized separation equipment.

Cryogenic distillation and catalytic combustion have both been proposed for the purification of argon in order to promote additional argon conservation. However, both of these methods are costly to implement and to operate. Moreover, the design of a cryogenic distillation system is generally controlled by the maximum instantaneous demand with respect to impurity levels and flowrate. When used in applications such as argon recycle purification, where impurity levels and flows may vary greatly with time, the equipment may then be considerably oversized with respect to the time-averaged requirement. The sizing of catalytic combustion equipment is similarly controlled by the maximum instantaneous requirement.

Accordingly it is an object of this invention to provide an improved method and apparatus for purifying argon.

It is a further object of this invention to provide an improved method and apparatus for purifying argon which can be effectively employed under conditions of wide variations in flows and in impurity concentration levels.

It is yet another object of this invention to provide an improved method and apparatus for purifying argon which is less costly than heretofore available systems.

SUMMARY OF THE INVENTION

The above and other objects which will become apparent to one skilled in the art upon a reading of this disclosure are attained by the present invention, one aspect of which is:

Method for purifying argon comprising:

(A) providing a gaseous argon stream comprising one or more of oxygen, nitrogen, water vapor, hydrogen, carbon monoxide, carbon dioxide and hydrocarbon impurities;

(B) passing the gaseous argon stream through a bed comprising molecular sieve adsorbent at ambient temperature and adsorbing thereon water vapor and/or carbon dioxide;

(C) passing the gaseous argon stream through a bed comprising catalytic material at ambient temperature and chemisorbing thereon oxygen, hydrogen and/or carbon monoxide;

(D) passing the gaseous argon stream through a bed comprising adsorbent at a cryogenic temperature and adsorbing thereon nitrogen and/or hydrocarbon; and (E) recovering a purified argon stream.

Another aspect of the present invention comprises:

(A) a bed comprising molecular sieve and means for providing impurity containing gaseous argon through the molecular sieve bed;

(B) a bed comprising catalytic material and means for providing impurity containing gaseous argon through the catalytic material bed;

(C) a bed comprising adsorbent and means for providing impurity containing gaseous argon through the adsorbent bed;

(D) means for reducing the temperature of the gaseous argon to a cryogenic temperature prior to its passage through the adsorbent bed; and (E) means for recovering purified argon from the adsorbent bed.

As used herein the term "ambient temperature" means a temperature within the range of from $-30°$ C. to $+50°$ C.

As used herein the term "cryogenic temperature" means a temperature below $-120°$ C.

As used herein the term "bed" means a permeable aggregate of pelletized solid particles held within a vessel.

As used herein the term "catalytic material" means a solid material which under certain conditions of temperature and pressure increases the rate of specific chemical reactions while itself remaining unchanged at the completion of the reaction.

As used herein the term "adsorption" means the reversible process whereby some components of a gas mixture adhere to the surface of solid bodies with which they are in contact.

As used herein the term "chemisorption" means an adsorption process in which certain components of a gas mixture selectively adhere to the surface of the solid as a result of chemical forces.

BRIEF DESCRIPTION OF THE DRAWING

The sole FIGURE is a schematic representation of one preferred embodiment of the invention.

DETAILED DESCRIPTION

The invention comprises up to three argon purification steps, depending upon which species of impurities are present in the argon, the steps being an ambient temperature molecular sieve adsorption step, an ambient temperature chemisorption step and a cryogenic temperature adsorption step which is particularly advantageous if the purified argon is to be liquified such as for storage purposes.

The invention will be described in detail with reference to the FIGURE which illustrates a preferred embodiment of the invention wherein the subject beds or vessels are arranged in pairs which are installed in parallel to allow continuous operation. That is, while the first of each pair of vessels is purifying the argon stream the second of the pair is undergoing regeneration and at the appropriate time the flows are switched so that the first is being regenerated while the second carries out the purification. In an alternative arrangement the beds could be dual bed single vessel adsorbers.

Referring now to the FIGURE, there is provided a gaseous argon stream 1 comprising impurities generally at a concentration within the range of from 1 part per million to 1 percent. Typically the impurity-containing gaseous argon stream is taken from an industrial process involving the use of argon as a blanketing or purge gas, as a heat transfer medium or as an atomization carrier gas. The impurities may include one or more of oxygen, nitrogen, water vapor, hydrogen, carbon monoxide, carbon dioxide and one or more hydrocarbons such as methane, ethane or propane.

The gaseous impurity-containing argon stream is passed through a bed comprising molecular sieves contained in vessel 101. The preferred type of molecular sieve is NaX zeolite. Other types of molecular sieves which may be employed include NaA, CaA and CaX. Those skilled in the art are familiar with molecular sieves and their designations as set forth herein. As the gaseous argon stream passes through the molecular sieve bed, water vapor and/or carbon dioxide, if present, are adsorbed at ambient temperature from the gaseous argon stream onto the molecular sieve bed. That is, at least one of water vapor and carbon dioxide are adsorbed onto the molecular sieve bed.

The resulting gaseous argon stream 2 is then passed through a bed comprising catalytic material contained in vessel 103. Among the different types of catalytic material which may be employed in the bed contained in vessel 103 one can name various reduced forms of nickel or cobalt. The preferred material comprises extruded pellets containing a high percentage of nickel on an alumina-silica support. As the gaseous argon stream passes through the bed of catalytic material, oxygen, hydrogen and/or carbon monoxide, if present, are chemisorbed at ambient temperature from the gaseous argon stream onto the bed of catalytic material. That is, at least one of oxygen, hydrogen and carbon monoxide are chemisorbed onto the bed. The chemisorption step itself is not catalytic. The chemisorbent is a material which under certain conditions, specifically at the regeneration temperature, does act as a catalyst for a reaction between at least one of the contaminants and another gas which may either be present as an adsorbed contaminant or added to the regeneration gas.

The resulting gaseous argon stream 3 is cooled by passage through heat exchanger 108 generally to a cryogenic temperature which is close to its dewpoint, generally within the range of from $-150°$ C. to $-180°$ C. The resulting gaseous argon stream 4 is then passed through a bed comprising adsorbent contained in vessel 105. The preferred type of adsorbent is NaX zeolite. Other types of adsorbent which may be employed include CaA and CaX. Those skilled in the art are familiar with adsorbents and their designations as set forth herein. As the gaseous argon stream passes through the adsorbent bed, nitrogen and/or hydrocarbons, if present, are adsorbed at a cryogenic temperature from the gaseous argon stream onto the adsorbent bed. That is, at least one of nitrogen and hydrocarbon are adsorbed onto the bed.

The resulting stream 5 is purified argon having an argon concentration generally of 99.999 percent or more. This purified argon may be recovered and may be recycled to the industrial process for reuse. The embodiment illustrated in the FIGURE is a preferred embodiment wherein the purified argon is condensed for storage and/or for more efficient pressurization if higher pressures are desired. In this embodiment purified argon stream 5 is condensed by passage through heat exchanger 109 by, indirect heat exchange with liquid nitrogen 20 supplied to heat exchanger or condenser 109 from liquid nitrogen storage tank 111. Liquefied argon 6 may then be passed to liquid argon storage tank 110. The liquid argon may be withdrawn from storage tank 110 as stream 7 and may be pumped to a higher pressure by pump 112. In this way, if a higher pressure is desired, the liquid pumping raises the pressure of the argon much more efficiently than if pressurization of gaseous argon were carried out. Pressurized liquid argon 8 is then vaporized such as by passage through atmospheric vaporizer 113 and the resulting argon 9 may be recovered and recycled to the industrial process for reuse.

Gaseous nitrogen 21 resulting from the heat exchange in heat exchanger or condenser 109 is warmed to ambient temperature by passage through heat exchanger 108 by indirect heat exchange with cooling gaseous argon as was previously described thereby recovering additional refrigeration from the vaporized nitrogen. The resulting gaseous nitrogen 22 is employed to regenerate the molecular sieve bed and the bed of catalytic material.

As mentioned previously, the embodiment illustrated in the FIGURE employs a pair of vessels for each cleaning step, one vessel employed in cleaning the gaseous argon while the other undergoes regeneration. Vessel 102 contains a bed similar so that contained in vessel 101 and vessel 104 contains a bed similar to that contained in vessel 103. While the beds in vessels 101 and 103 are carrying out the aforedescribed cleaning, the beds in vessels 102 and 104 are being regenerated by use of regeneration gas comprising gaseous nitrogen 22. The regeneration gas is warmed in electrical heater 107 during the first part of the regeneration. This gas flows countercurrently to the flow during adsorption, entering the bottom of vessel 104 and exiting the top of vessel 102, prior to being vented to the atmosphere. When the outlet of bed 104 has reached the desired desorption temperature, a small amount of externally-supplied hydrogen is added to the regeneration gas for a short interval to assist regeneration of the chemisorbent. The hydrogen content of the mixed regeneration gas during this step is typically about 1 percent. The heating step continues after the flow of hydrogen is terminated, until the outlet of adsorber 102 reaches its desired regeneration temperature. Heater 107 is then de-energized and regeneration gas flow continued to cool the two adsorbers to near-ambient temperature. The beds in vessels 102 and 104 are then ready to be switched into adsorption service.

In a similar fashion, vessel 106 contains a bed similar to that contained in vessel 105. While the bed in vessel 105 is carrying out the aforedescribed cleaning, the bed in vessel 106 is being regenerated. The initial part of the regeneration is accomplished by closed-loop recirculation of argon gas through atmospheric heater 114, blower 115 and vessel 106 in a direction countercurrent to the flow during adsorption. The gas then returns to the atmospheric heater. When the gas leaving vessel 106 approaches ambient temperature, a fraction of the purified argon leaving adsorber 105 is diverted through valve 117 to vessel 106, and then vented from the cryogenic adsorption system through valve 118. This purges the regeneration recirculation loop of the desorbed contaminants.

Cooldown is accomplished by closing valve 118. The flow through valve 117 is then directed from the top of adsorber 106 through atmospheric heater 114, blower 115, aftercooler 116 and valve 119 into stream 3 which is the feed stream to the cryogenic system. This gas is cooled in heat exchanger 108 and flows through adsorber 105 with the feed, following which the recirculating fraction is split off from the product through valve 117.

The argon vented through valve 118, to purge the regeneration loop of the cryogenic adsorption system, is the only significant argon loss from that system. This step is timed to coincide with the last regeneration step of the ambient temperature adsorbers. The argon purge replaces the nitrogen regeneration gas flow to the latter adsorbers during this interval, purging nitrogen from the vessels and thereby preparing for their switch to adsorption service.

The design of the cleaning steps which are employed with the argon purification system of this invention are primarily controlled by the time-averaged requirement. The amount of each adsorbent which must be supplied is a function of the total amount of the associated impurities which must be removed during a complete adsorption half-cycle. The bed shape can be arranged to constrain pressure drop to an acceptable level at the maximum adsorption flowrate. The regeneration system can be designed based on the time-averaged adsorbent requirement. This invention thereby facilitates economical sizing of equipment.

Although the invention has been described in detail with reference to a certain preferred embodiment, those skilled in the art will recognize that there are other embodiments of the invention within the spirit and the scope of the claims.

I claim:

1. A method for purifying argon comprising:
    (A) providing a gaseous argon stream comprising one or more of oxygen, nitrogen, water vapor, hydrogen, carbon monoxide, carbon dioxide and hydrocarbon impurities;
    (B) passing the gaseous argon stream through a bed comprising molecular sieve adsorbent at ambient temperature and adsorbing thereon water vapor and/or carbon dioxide;
    (C) passing the gaseous argon stream through a bed comprising catalytic material at ambient temperature and chemisorbing thereon oxygen, hydrogen and/or carbon monoxide;
    (D) passing the gaseous argon stream through a bed comprising adsorbent at a cryogenic temperature and adsorbing thereon nitrogen and/or hydrocarbon; and
    (E) recovering a purified argon stream.

2. The method of claim 1 wherein the purified argon is liquefied.

3. The method of claim 2 wherein the liquefied argon is increased in pressure and subsequently vaporized.

4. The method of claim 2 wherein the purified argon is liquefied by indirect heat exchange with vaporizing liquid nitrogen.

5. The method of claim 4 wherein the vaporized nitrogen is heated by indirect heat exchange with gaseous argon to cool the gaseous argon to a cryogenic temperature prior to the cryogenic adsorption of step (D).

6. The method of claim 4 wherein the vaporized nitrogen is employed to regenerate the bed of catalytic material.

7. The method of claim 4 wherein the vaporized nitrogen is employed to regenerate the molecular sieve bed.

8. Apparatus for purifying argon comprising.
    (A) a bed comprising molecular sieve and means for providing impurity containing gaseous argon through the molecular sieve bed;
    (B) a bed comprising catalytic material and means for providing impurity containing gaseous argon through the catalytic material bed;
    (C) a bed comprising adsorbent and means for providing impurity containing gaseous argon through the adsorbent bed;
    (D) means for reducing the temperature of the gaseous argon to a cryogenic temperature prior to its passage through the adsorbent bed; and
    (E) means for recovering purified argon from the adsorbent bed.

9. The apparatus of claim 8 further comprising a condenser, means to provide liquid nitrogen to the condenser and means to provide purified argon to the condenser.

10. The apparatus of claim 9 further comprising a liquid storage tank and means to pass liquid from the condenser to the liquid storage tank.

11. The apparatus of claim 10 further comprising means to raise the pressure of the liquid passed from the condenser and means to vaporize the pressurized liquid.

12. The apparatus of claim 9 further comprising a heat exchanger and means to pass gaseous nitrogen from the condenser to the heat exchanger.

13. The apparatus of claim 12 further comprising means to provide gaseous nitrogen from the heat exchanger to the bed comprising catalytic material.

14. The apparatus of claim 12 further comprising means to provide gaseous nitrogen from the heat exchanger to the bed comprising molecular sieve.

* * * * *